United States Patent [19]

Waite

[11] 4,373,031

[45] Feb. 8, 1983

[54] SYNTHESIS OF ANION EXCHANGE POLYMERS EMPLOYING DITERTIARY AMINES

[75] Inventor: Warren A. Waite, Burlington, Mass.

[73] Assignee: Ionics, Incorporated, Watertown, Mass.

[21] Appl. No.: 190,787

[22] Filed: Sep. 25, 1980

[51] Int. Cl.$^3$ .............................................. B01J 41/04
[52] U.S. Cl. .................................................... 521/32
[58] Field of Search .......................................... 521/32

[56] References Cited

U.S. PATENT DOCUMENTS

| | | | |
|---|---|---|---|
| 3,843,566 | 9/1974 | Barrett | 521/32 |
| 4,093,567 | 6/1978 | Hurwitz et al. | 521/32 |
| 4,191,814 | 3/1980 | Amich | 521/32 |

*Primary Examiner*—William F. Hamrock
*Assistant Examiner*—Peter F. Kulkosky
*Attorney, Agent, or Firm*—Norman E. Saliba

[57] ABSTRACT

The reaction of vinylbenzyl chloride and N, N, N', N', 2-pentamethyl-1,2-propanediamine (PMPDA) produces a high capacity, base stable, crosslinked, anion exchange polymer useful especially when manufactured in sheet or membrane form for use in electrodialysis apparatus.

9 Claims, No Drawings

SYNTHESIS OF ANION EXCHANGE POLYMERS EMPLOYING DITERTIARY AMINES

BACKGROUND OF INVENTION

This invention is directed to novel anion exchange polymers of the quaternary ammonium type and to the use of the same in the manufacture of anion exchange membranes for use in electrodialysis apparatus and processes.

DESCRIPTION OF THE PRIOR ART

The usual technique for the production of ion-exchange polymers involves polymerizing a non-ionic, non-water soluble, cross-linking agent, as for example, divinyl benzene with a monomer such as vinylbenzyl chloride (VBC) in a non-aqueous solvent such as diethylbenzene as is described for example, in U.S. Pat. No. 2,780,604 (Clark et al). The resulting solid polymer, for example, in sheet or membrane form is equilibrated or washed several times with a water soluble solvent such as methanol so as to remove and replace the diethylbenzene solvent which is hydrophobic. Where anion exchangers are desired the membranes are then reacted with an aqueous solution of an amine such as trimethylamine to form quaternary ammonium chloride groups which gives the polymer its strongly basic ion-exchange properties. The prior art has disadvantages in that the cross-linking agent is non-ionic thus producing polymers having low ion-exchange capacity. Further the polymers have not shown good stability in high pH solutions (pH=10-14) such as caustic solutions. The prior art membranes typically will severly deteriorate and become limp and rubbery when exposed to a pH 12 solution for 1 to 2 days.

The present invention comprises an improvement over the methods and the product of the prior art by providing monomers polymerized in a system employing a chloromethyl styrene cross linking (XL) agent and a aliphatic ditertiary amine of high base strength. Thus ion-exchange polymeric resin or membranes are prepared having high ion-exchange capacities, low electrical resistance, improved stability in basic solutions and increased membrane stiffness (modulus). Additionally the manufacturing step requires shorter time periods since there is no secondary treatment required for introducing the anionic functional groups into the polymer backbone.

The membranes of the present invention and the process of making the same were found to have very desirable properties such as (a) high stiffness (Modulus) (b) increased stability to caustic media (c) high yields of leak free membranes-90% or better, (d) resistance below 10 ohm-cm$^2$, (e) no solvent (methanol, ethylene dichloride etc.) wash treatment required (f) no secondary treatment such as methylation or amination is required and (g) high strong base ion-exchange capacity.

SUMMARY OF THE INVENTION

The invention comprises the reaction product resulting from combining a chloromethyl styrene monomer with an aliphatic ditertiary amine of high base strength mixed with a water miscible non-polymerizable (NP) solvent and a polymerization catalyst. The monomer is simultaneously cross-linked and functionalized by employing a diamine compound containing two tertiary amino groups; which are terminally located. A preferred diamine is N, N, N′, N′, 2-pentamethyl-1,2 propanediamine.

The monomers of the present invention contains chloromethyl groups on the benzene ring and typically include vinylbenzyl chloride (VBC), bis-(chloromethyl) styrene etc. The preferred monomer is VBC containing one chloromethyl group for each aromatic nucleus.

The anion polymer may be synthesized using a wide ratio range of chloromethyl styrene to the diamine compound but it is preferred that the starting liquid mix comprise anywhere from 1 to 3 moles of chloromethyl styrene to each mole of the diamine and most preferred is the mole ratio of 2 to 1. The simultaneous cross linking and functionalization of the chloromethyl styrene monomers is carried out by use of a diamine i.e. containing two tertiary amino groups both of which are terminal groups as shown by the following formula:

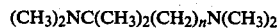

Where n is 1 to 6, preferably 1.

As previously stated, the preferred diamine for use in the present invention is N, N, N′, N′, 2-pentamethyl-1,2-propanediamine (CAS registry number 68367-53-3) known by the trademark Amine PMT and obtainable from International Minerals and Chemical Corporation. Amine PMT is an aliphatic, ditertiary amine of high base strength having the formula:

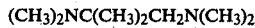

The known uses of Amine PMT are primarily as a catalyst in the preparation of rigid or flexible urethane foams and as a corrosion inhibitor of steel.

A suitable class of free-radical generating compounds which can be used as catalysts for polymerization are the azo catalysts. The azobisisobutyronitrile, azobisisobutyramide, azobis (α, α-dimethylvaleronitrile), azobis (α-methyl-butyronitrile) and dimethyl, diethyl, or dibutyl azobis (methyl-valerate). These compounds, which serve as free radical initiators, contain an —N=N-group (azo) attached to alphatic carbon atoms, at least one of which is tertiary. An amount of 0.01% to 2% of the weight of monomer or monomers is usually sufficient.

The non-polymerizable (NP) solvent or diluents employed should be water soluble and inert to the polymerization reaction, (in that they do not react chemically or polymerize with the monomers) should preferably be totally miscible with the starting liquid monomers and should act as a swelling agent for the resulting solid copolymer by being absorbed or inbibed therein. Solvents that may be employed in the present invention should be water soluble and include for example, the lower alcohols such as isobutyl (butanol), t-butyl etc, polyethers such as butoxyethoxy propanol etc, and blends of the above solvents with water. The volume of solvent present during polymerization determines the percent porosity and substantially fixes the solvent or water holding capacity or content of the resulting polymer. The solvent or NP content employed is typically 20 to 50% by volume of the final liquid formulation (mix) but may be more or less if so desired.

The polymerization reaction may be carried out in the temperature range of 30° C. to 100° C. but the preferred range is between about 60° C. to 80° C.

The preferred procedure for preparing the copolymers of this invention is further illustrated by the following examples:

EXAMPLE 1

To a liquid mixture of one mole (144.25 gms) of Amine PMT, two moles (304 gms) of vinylbenzyl chloride (VBC) and 150 gms. of a non-polymerizable solvent (isobutyl alcohol) was added 3 gms. of a soluble polymerization initiator 2,2′-azobis (2 methyl propionitrile) which is obtainable from Dupont Chemical Co. of Wilmington, Del. under the tradename VAZO 64. The mixture is stirred until homogeneous and then poured into a 2″ deep rectangular tray (11″×13″) into which was carefully laid in an alternating arrangement, glass plates and 20 mil thick modacrylic woven cloth until the top of the monomer liquid level was reached. The entire tray was put into an oven and heated overnight at which time the liquid monomer had turned to a solid resin mass. The excess solid resin was chipped from the tray and the glass plates carefully separated and removed to yield flat cloth sheets, about 20 mils thick impregnated with the polymerized resin. The resulting cloth reinforced polymeric membranes gave the following properties:

XL-NP=50–40
Mullen Burst=133 psi
Thickness=0.053 cm
Resistivity=9.7 ohm-cm$^2$ (0.01 N NaCl) (1000 Hz)
Water Content=46%
Capacity=3.56 Milliequivalents Cl$^-$ per gram of dry resin The resistance of the resulting membranes when placed in 0.1 normal NaOH (pH=13) at room temperature remained substantially unchanged over a 21 day test period. Membranes of the prior art made from VBC and dimethylaminoethylmethacrylate (DMAEMA) when treated in the same manner, substantially doubled in resistance within 7 days and became limp and rubbery.

The letters XL-NP mentioned above refer to the mole % crosslinking agent (XL) and volume % of non-polymerizable diluent (NP) in the polymerizable solution mix.

EXAMPLE 2

Membranes prepared as in Example 1 were further reacted for 17 hours at room temperature in a bath of methyl alcohol (CH$_3$OH) saturated with methyl chloride (CH$_3$Cl). The bath was contained in a closed vessel to prevent the gaseous methyl chloride from escaping from the alcohol during the reaction period. This methylation reaction may be employed when required to further increase the ion exchange capacity of the polymer by forming additional ammonium chloride groups.

The membranes so treated were washed in water and their properties determined as follows:

Mullen Burst=133 psi
Thickness=0.055 cm
Resistivity=9.2 ohm-cm$^2$
Water Content=47%
Capacity=3.77 Millequivalents Cl$^-$

EXAMPLE 3

The procedure of Example 1 was repeated except that only one half mole (72.13 gms) of the diamine Amine PMT was employed. The other half mole of diamine was made up by employing 56.1 gms. of triethylenediamine, an aliphatic tertiary amine. The chemical triethylenediamine(1,4-diazabicyclo [2.22.] octane) is known by the registered tradename Dabco and is commercially obtainable from Air Products and Chemicals Co. of Allentown, Pa. (chemical abstract registry number 280-57-9). Triethylenediamine which is normally employed as a urethane catalyst is obtainable as a hygroscopic white crystal having a molecular weight of 112.7 (formula C$_6$H$_{12}$N$_2$). It is a ditertiary amine in which the two nitrogens are linked by three ethylenic groups. This bicyclic molecular form provides a very compact and symmetrical structure as follows:

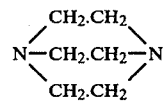

The membranes resulting from the above mixture gave the following properties:

XL-NP=50–40
Mullen Burst=132 psi
Thickness=0.058 cm
Resistivity=9.7 ohm-cm$^2$
Water Content=36%
Capacity=3.90 Milliequivalent These membranes were found to be unusually stiff. After 21 days in 0.1 normal NaOH (pH=13) at room temperature the membranes were substantially unchanged in appearance and stiffness.

As many apparently widely different embodiments of this invention may be made without departing from the spirit and scope thereof, it is to be understood that the invention is not limited to the specific embodiments thereof except defined in the appended claims.

The embodiments of this invention in which an exclusive property or privilege is claimed are defined as follows:

1. An ion-exchange, cross-linked, polymeric structure comprised essentially of a plurality of recurring units of the formula:

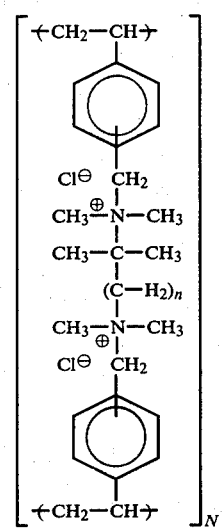

wherein n is 1.

2. A method of manufacturing an anion exchange resin comprising simultaneously cross-linking and functionalizing said resin by polymerizing in the presence of a polymerization catalyst and at a temperature of between about 30°–100° C., a chloromethyl styrene monomer with an aliphatic, ditertiary amine of high base strength mixed with a water soluble non-polymerizable solvent, said amine having the formula $(CH_3)_2NC(CH_3)_2(CH_2)_nN(CH_3)_2$ wherein n is 1.

3. The method of claim 2 wherein the monomer is vinylbenzyl chloride and the amine is N, N, N', N', 2-pentamethyl-1,2-propanediamine.

4. The method of claim 3 wherein the monomer is vinylbenzyl chloride and the amine is N,N, N', N', 2-pentamethyl-1,2 propanediamine to which triethylenediamine has been added thereto.

5. The method of claim 2 wherein the resulting polymer is methylated with an alkylating agent.

6. The method of claim 5 wherein the alkylating agent is methyl halide.

7. The product resulting from the method of claim 4.

8. The method of claim 2 wherein triethylenediamine is added as a second amine.

9. An electrochemical cell comprising chambers adapted to contain liquids defined by ion-permeable membranes and having terminal electrodes for passing a direct current transversely through said chambers and membranes, the improvement wherein at least some of said membranes are comprised of the anion-selective type of claim 1.